United States Patent
Yoshimoto et al.

(10) Patent No.: US 9,607,570 B2
(45) Date of Patent: Mar. 28, 2017

(54) MAGNIFYING TOOL FOR VIEWING AND INTERACTING WITH DATA VISUALIZATION ON MOBILE DEVICES

(75) Inventors: Brandon Yoshimoto, Los Angeles, CA (US); Hugh Zhang, Winchester, MA (US); Prashant Singh, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/406,357

(22) Filed: Feb. 27, 2012

(65) Prior Publication Data
US 2013/0147834 A1 Jun. 13, 2013

Related U.S. Application Data

(60) Provisional application No. 61/568,542, filed on Dec. 8, 2011.

(51) Int. Cl.
*G09G 5/26* (2006.01)
*G09G 5/00* (2006.01)
(Continued)

(52) U.S. Cl.
CPC ............ *G09G 5/00* (2013.01); *G01C 21/367* (2013.01); *G06F 3/0481* (2013.01);
(Continued)

(58) Field of Classification Search
CPC .... G09G 2340/0407; G09G 2340/0414; G06T 3/40; G06F 3/0481; G06F 2203/04806
See application file for complete search history.

(56) References Cited

U.S. PATENT DOCUMENTS

| 5,754,348 A | 5/1998 | Soohoo |
| 5,910,800 A | 6/1999 | Shields |

(Continued)

FOREIGN PATENT DOCUMENTS

| CN | 101419526 A | 4/2009 |
| CN | 101510008 A | 8/2009 |

(Continued)

OTHER PUBLICATIONS

International Search Report dated May 7, 2013 for Application No. PCT/US2012/068545, 16 pages.
(Continued)

*Primary Examiner* — David H Chu
(74) *Attorney, Agent, or Firm* — Tucker Ellis LLP

(57) ABSTRACT

In accordance with various embodiments, a magnifying tool is provided in a user interface for magnifying content displayed on a mobile device and any other device with a restricted or limited viewing screen. A mobile device, including a magnifying tool for magnifying content displayed on the mobile device, can comprise a computer readable storage medium and processor. The mobile device can include a touchscreen operable to receive input from a user and display content. When the mobile device receives a selection of a location on the touchscreen, the mobile device determines a position of the location on the screen, determines a portion of the screen to magnify, and magnifies the portion of the screen and overlays the magnified portion on the screen.

20 Claims, 4 Drawing Sheets

(51) Int. Cl.
  *G01C 21/36* (2006.01)
  *G09G 3/20* (2006.01)
  *G06T 3/00* (2006.01)
  *G06F 3/0488* (2013.01)
  *G06F 17/30* (2006.01)
  *G06F 3/0481* (2013.01)

(52) U.S. Cl.
  CPC ...... *G06F 3/0488* (2013.01); *G06F 17/30554* (2013.01); *G06F 17/30994* (2013.01); *G06T 3/0025* (2013.01); *G09G 3/20* (2013.01); *G06F 2203/04805* (2013.01); *G06F 2203/04806* (2013.01); *G09G 2340/045* (2013.01); *G09G 2340/145* (2013.01)

(56) References Cited

U.S. PATENT DOCUMENTS

| | | | | |
|---|---|---|---|---|
| 8,503,665 | B1* | 8/2013 | Meisel | H04M 3/4936 379/265.02 |
| 2009/0217164 | A1* | 8/2009 | Beitle et al. | 715/702 |
| 2009/0322687 | A1* | 12/2009 | Duncan | G06F 3/04883 345/173 |
| 2010/0031174 | A1* | 2/2010 | Kim | 715/764 |
| 2010/0033503 | A1* | 2/2010 | Baar et al. | 345/647 |
| 2010/0214300 | A1* | 8/2010 | Alsbury et al. | 345/440.2 |
| 2011/0141031 | A1 | 6/2011 | McCullough et al. | |
| 2011/0314376 | A1* | 12/2011 | Dearman et al. | 715/711 |
| 2012/0005045 | A1* | 1/2012 | Baker | 705/27.2 |
| 2012/0030074 | A1* | 2/2012 | Rotenberg | G06Q 40/06 705/30 |

FOREIGN PATENT DOCUMENTS

| | | |
|---|---|---|
| CN | 101539833 A | 9/2009 |
| JP | 2004178384 | 6/2004 |
| JP | 2012226393 | 11/2012 |
| WO | WO 2010118292 | 10/2010 |
| WO | WO 2010118292 A1 * | 10/2010 |

OTHER PUBLICATIONS

State Intellectual Property Office of the People's Republic of China Search Report dated Aug. 3, 2015 for Application No. 201280058615.9, 3 pages.

* cited by examiner

MAGNIFYING TOOL FOR VIEWING AND INTERACTING WITH DATA VISUALIZATION ON MOBILE DEVICES

CLAIM OF PRIORITY

This application claims the benefit of priority on U.S. Provisional Patent Application No. 61/568,542, entitled "MAGNIFYING TOOL FOR VIEWING AND INTERACTING WITH DATA VISUALIZATIONS ON MOBILE DEVICES" filed Dec. 8, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to mobile communications and mobile devices and in particular to providing a magnifying tool in a user interface for viewing and interacting with data visualizations on mobile devices and any other device with a restricted or limited viewing screen.

BACKGROUND

Understanding dense data is a problem that exists in many different forms of data visualizations. On mobile devices where screen size is limited, the problem becomes even more severe, because there is even less space to differentiate and describe the data.

One method of dealing with this issue was the use of touch gestures, such as a pinch, to zoom in on the data. While this is effective in viewing small objects, it restricts the view of the user to a smaller total portion of the content, causing them to lose context on the surrounding data. Also, previously users were enabled to finely position a cursor within text, by magnifying the position of the cursor within that text.

SUMMARY

In accordance with various embodiments, a magnifying tool is provided in a user interface for magnifying content displayed on a mobile device and any other device with a restricted or limited viewing screen. A mobile device, including a magnifying tool for magnifying content displayed on the mobile device, can comprise a computer readable storage medium and processor. The mobile device can include a touchscreen operable to receive input from a user and display content. When the mobile device receives a selection of a location on the touchscreen, the mobile device determines a position of the location on the screen, determines a portion of the screen to magnify, and magnifies the portion of the screen and overlays the magnified portion on the screen.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with an embodiment of the invention, a magnifying lens can be used to focus on dense data, such as that displayed on a mobile device. When a user touches the screen for a period of time, a magnifying lens appears in the user interface and can be used to magnify details that would not be visible otherwise. This magnifying lens appears on only a portion of the screen, allowing the user to maintain context on the surrounding data. Additionally, this enables the user to interact with these small data objects, that were otherwise too densely displayed to be interacted with. In accordance with an embodiment of the invention, a crosshair could appear within the magnifying lens, indicating the current interaction target. This improves the user experience for mobile data visualizations and enables mobile data visualizations to usefully display larger data sets. It also enables the user to more easily interact with these mobile data visualizations.

Figure 1:
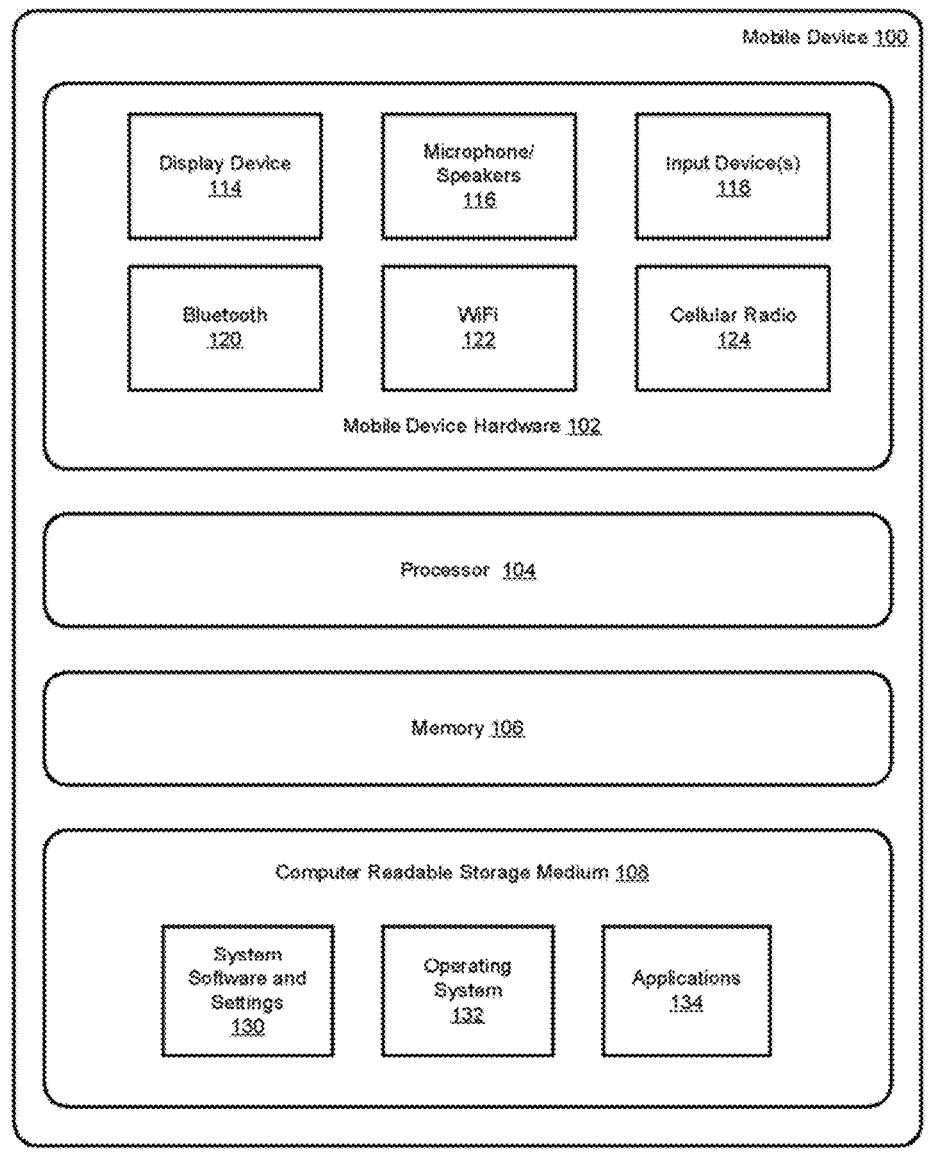
FIG. 1 is a diagram of components of a mobile device, in accordance with an embodiment of the invention.

FIG. 1 is a diagram of components of a mobile device, in accordance with an embodiment of the invention. As shown in FIG. 1, a mobile device 100 can include mobile device hardware 102, a processor (such as a mobile processor, low-power processor, or other specialized central processing unit for mobile devices), memory 106, and computer readable storage medium 108. The mobile device hardware can include a display device 114, which can be configured as a touchscreen such that a user can interact with the device by touching the display device. The mobile device can also include one or more microphones and speakers 116. Additional input devices such as keyboards, trackpads, and other input devices 118 may also be included or connected to the mobile device. The mobile device can also be configured to communicate over a plurality of different networks and/or protocols such as Bluetooth 120, WiFi 122, and various cellular and/or data networks 124. The mobile device can be further configured to communicate over any number of other wireless or wired media, as is generally known in the art. The computer readable storage medium can include system software and settings 130, an operating system such as Android, iOS, Windows Mobile 7 and others, and a plurality of applications 134.

Figure 2:
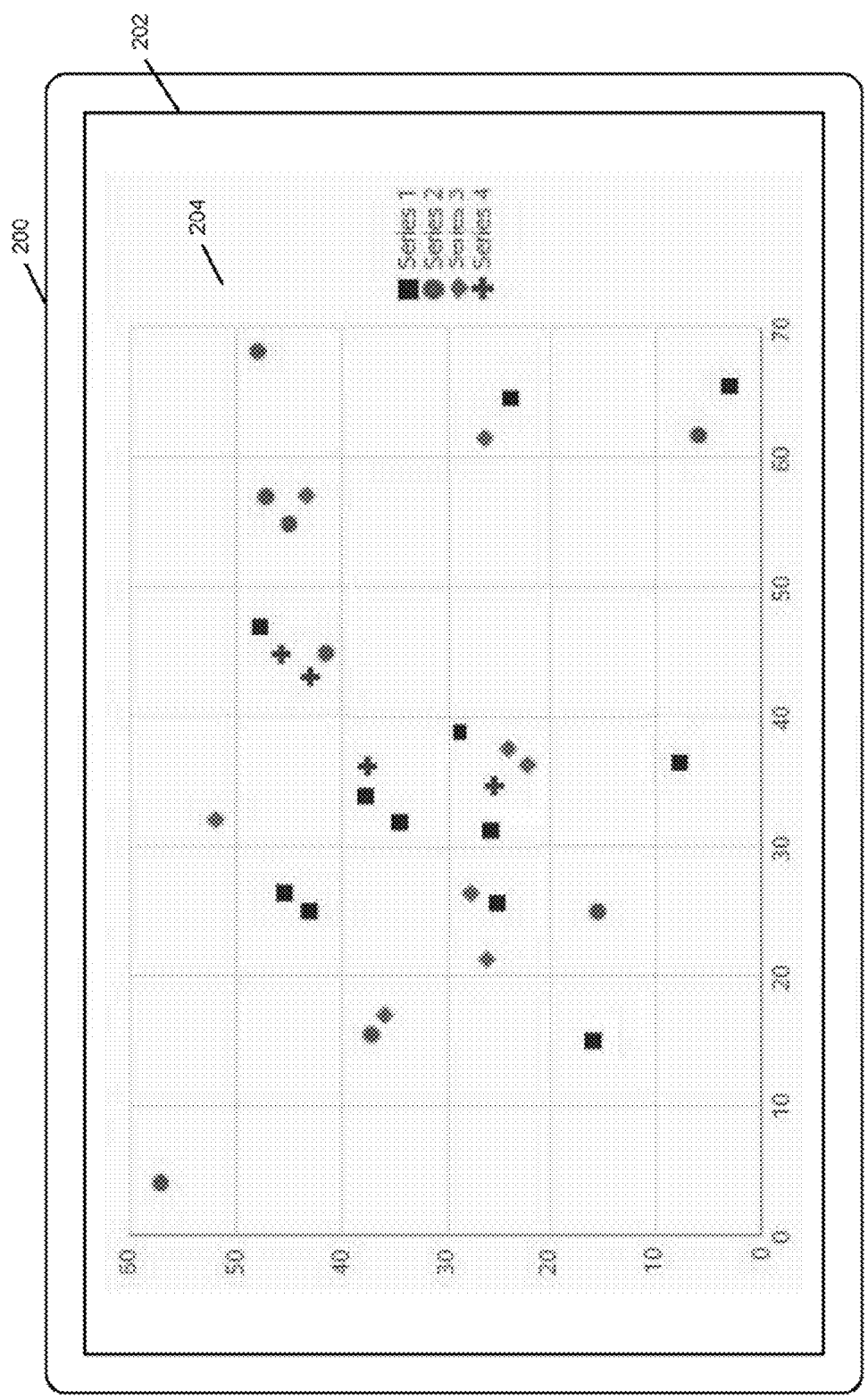
FIG. 2 is an illustration of a mobile device, in accordance with an embodiment of the invention.

FIG. 2 is an illustration of a mobile device, in accordance with an embodiment of the invention. As shown in FIG. 2, mobile device 200 can include a touch-sensitive screen (touchscreen) 202 on which a variety of different content can be displayed. In this example, a scatter graph 204 is shown. In scatter graphs, the markers almost always appear small and numerous when displayed on a screen. Additional information may be available in the form of a tooltip (also called a datatip). In this case, additional information can be displayed by selecting a marker on the scatter graph. However, given how densely the markers on the graph are displayed, it can be difficult for the user to reliably select the intended marker using the touchscreen. In previous systems, the user could zoom in on a portion of the chart and then select individual markers. However, when the user zoomed in, they could only see that small portion of the chart they zoomed in on, losing the context of the chart (such as the axes and relation to other markers).

Figure 3:
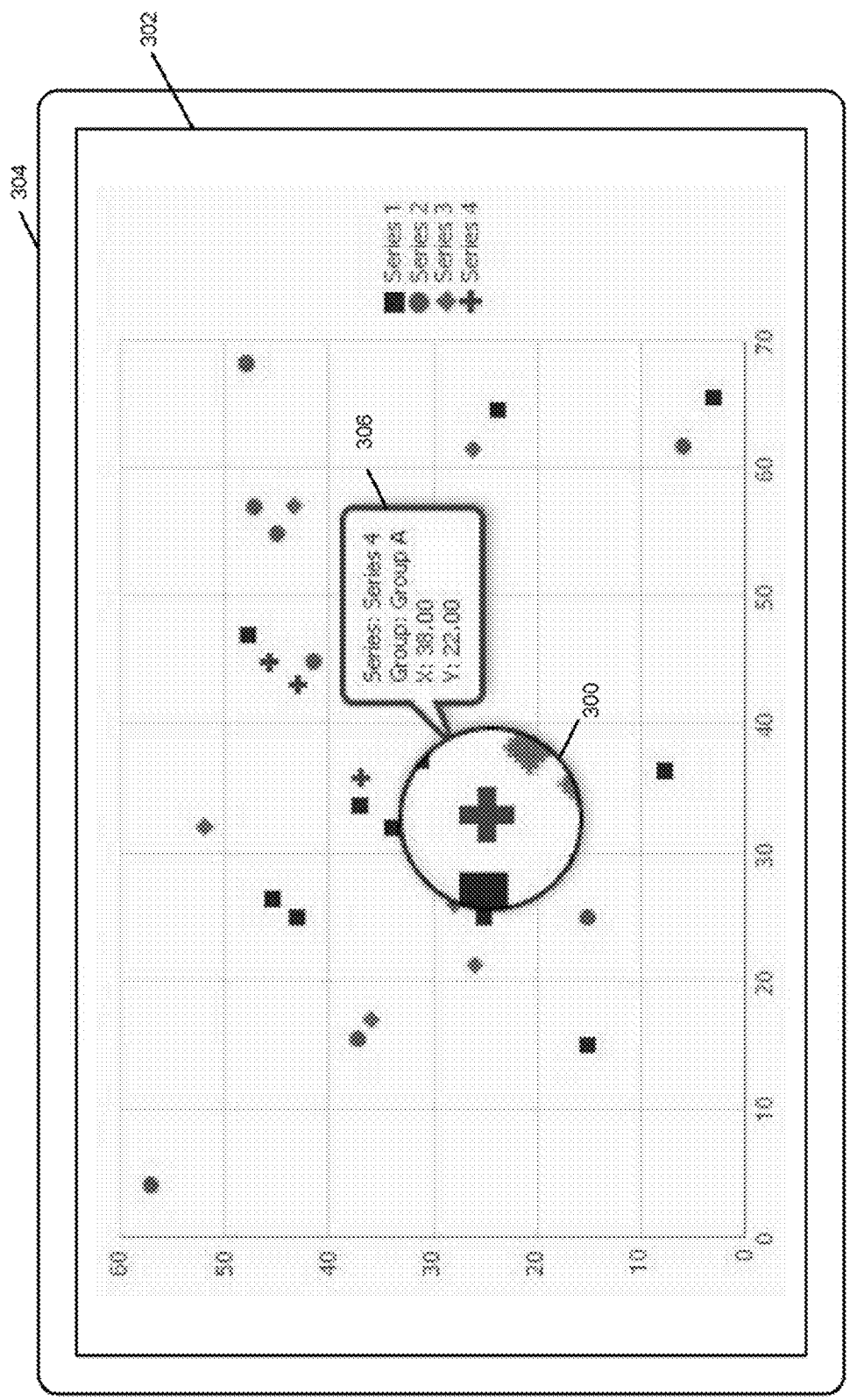
FIG. 3 is an illustration of magnified content on a mobile device, in accordance with an embodiment of the invention.

FIG. 3 is an illustration of magnified content on a mobile device, in accordance with an embodiment of the invention. As shown in FIG. 3, by touching and holding, the user can bring up a magnifying lens 300 which is overlaid on the graph. The magnifying lens can magnify a portion of the graph and display that portion in a window on the graph. This enables the user to more precisely interact with the data shown on the screen 302 of the mobile device 304. The magnifying lens provides visual feedback as the user moves their finger to make fine adjustments while targeting an item to view a datatip. The user can position the item or element of interest at the center of the magnifying lens, and interact with that element. For example, as shown in FIG. 3, additional information 306 can be displayed about the element shown in the magnifying lens.

In accordance with an embodiment of the invention, the magnifying lens is a floating window that magnifies the content under/near the user's finger when interacting with a data visualization on a mobile or "touch" device. In Data Visualization Tools (DVT) components, it is often important to access information about a particular piece of data which is present in a tooltip (also called a datatip). On a desktop, this is not hard because the mouse pointer can target small items very precisely. On touch devices, there is no mouse pointer, so the user will use their finger to interact with the graph and access datatips. However, because data is typically visually smaller than the finger size, the finger will completely cover this data, making it hard to know what is currently being accessed. This becomes even more difficult when a lot of data is clustered in a tight space. The magnifying lens can be used across data visualizations where viewing contextual information about small/clustered data points or visual elements is essential to a task on a touch device.

In accordance with an embodiment of the invention, the magnifying lens can be used with a plurality of different types of visualizations. For example, other charts such as thin bars in a bar graph. Additionally, maps are a commonly used feature on mobile devices, the magnifying lens could be used to view locations of restaurants at a particular location, while maintaining the visual relationship between the restaurant location and the user's current location on the map. Thus, by magnifying a portion of the content shown on the screen, without merely zooming in on a portion of the screen, the user maintains valuable context information, enhancing the usefulness of the mobile device. Additionally, the magnifying lens can be used to show a more detailed layer of data. For example, when looking at electoral data by state on a map, the lens could display county level data of its contents. In this usage, the magnification would be optional, allowing the user to see the visualization at its usual scale.

When not needed, the magnifying lens can be dismissed by pressing a collapse button, touching a different location on the screen, releasing contact with the screen, using a gesture, or other similar means. The allows the full space of the screen to be reclaimed for other purposes.

Figure 4:
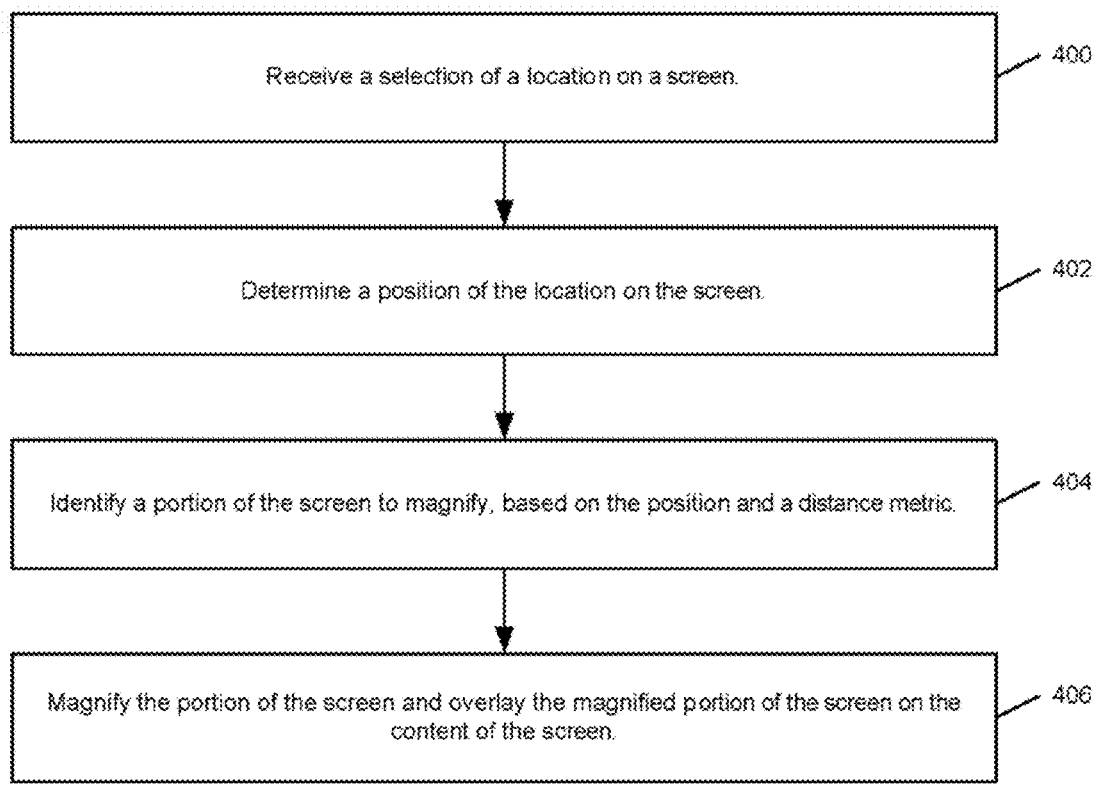
FIG. 4 shows a method of magnifying content on a mobile device, in accordance with an embodiment of the invention.

FIG. 4 shows a method of magnifying content on a mobile device, in accordance with an embodiment of the invention. At step 400, a selection of a location on a screen is received. This can be done by the user by touching and holding down a finger on a particular location on the screen. At step 402, the position of the location on the screen is determined. At step 404, a portion of the screen to magnify is determined. This can be determined based on the position and on a distance metric. For example, if a circular portion of the screen is to be magnified, the distance metric can be a predetermined radius. In accordance with an embodiment of the invention, the distance metric can be dynamically calculated depending on how densely the elements appear in the content being magnified, where elements can be data points or other items the user can interact with. At step 406, the portion of the screen is magnified and the magnified portion of the screen is overlaid on the content of the screen. The magnifying lens can appear visually above the current position of the finger. The magnifying lens is displayed such that the surrounding content remains visible. When a plurality of locations are selected on the screen in succession, for example, as the user moves their finger around the screen, while still touching the screen, the position being selected is tracked and the content of the magnifying lens is updated accordingly. Additionally, a tooltip can be displayed for an element located at the center of the magnified portion of the screen. In accordance with another embodiment, when the user releases or removes their finger from the screen, the magnifying lens disappears.

In accordance with an embodiment of the invention, the magnifying lens functionality can be implemented using an ADF Tag API, for example: magnifyLens="off (default) |auto". In this example, "auto" defaults are defined as follows. In accordance with an embodiment of the invention, for mobile or "touch" devices, the magnifying lens is enabled only for the specific case of visually dense content, such as scatter graphs. In accordance with another embodiment, for desktop devices, the magnifying lens is disabled by default.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method of magnifying content on a device having a touchscreen, the method comprising:
    displaying a graph comprising a plurality of data elements arranged on one or more axis on the touchscreen of the device, wherein the device is a mobile device which includes a computer readable medium and processor;
    enabling a magnification process in response to said displaying of said graph;
    receiving a selection of a first location on the touchscreen by a finger touching the touchscreen at said first location;
    determining a first position of the finger touching of the touchscreen;
    calculating a first distance metric dependent upon a first density of data elements at the first position;
    determining a first portion of the graph to magnify in response to the first position of the finger touching of the touchscreen based on the first position of the finger touching of the touchscreen and the first distance metric;
    using said magnification process, enabled by said displaying of said graph, to magnify the first portion of the graph and overlay a first magnified portion of the graph over the graph on the touchscreen displaced from the first position such that viewing the first magnified portion is not obstructed by the finger;
    automatically identifying a first single particular data element of the plurality of data elements centrally located in the first magnified portion of the graph;
    automatically displaying on the touchscreen, in response to said automatically identifying said first single particular data element and without requiring further user action, entirely outside the first magnified portion of the graph, a tooltip for the identified first single particular data element which is centrally located in the first magnified portion of the graph, wherein the tooltip includes information about the first single particular data element wherein the information was not present in the graph;
    receiving a selection of a second location on the touchscreen by tracking the finger while the finger is moving around the touchscreen in contact with the touchscreen;
    determining a second position of the finger touching of the touchscreen while the finger is moving around the touchscreen in contact with the touchscreen;
    calculating a second distance metric dependent upon a second density of data elements at the second position;
    determining a second portion of the graph to magnify in response to the second position of the finger touching of the touchscreen based on the second position of the finger touching of the touchscreen and the second distance metric;
    using said magnification process, enabled by said displaying of said graph, to magnify the second portion of the graph and overlay a second magnified portion of the graph over the graph on the touchscreen displaced from the second position such that viewing the second magnified portion is not obstructed by the finger;
    automatically identifying a second single particular data element of the plurality of data elements centrally located in the second magnified portion of the graph; and
    automatically displaying on the touchscreen, in response to said automatically identifying said second single particular data element step and without requiring further user action, entirely outside the first magnified portion of the graph, a tooltip for the identified second single particular data element which is centrally located in the second magnified portion of the graph, wherein the tooltip includes information about the second single particular data element wherein the information was not present in the graph.

2. The method of claim 1, wherein the first portion of the graph to magnify and the second portion of the graph to magnify are circular and the first distance metric and the second distance metric correspond to a first radius of the first portion of the graph to magnify and a second radius the second portion of the graph to magnify.

3. The method of claim 1, wherein the method comprises, automatically displaying a plurality of different single particular tooltips for a plurality of different particular identified single particular data elements in response to tracking the finger touching the touchscreen through a plurality of locations while the finger is moving around the touchscreen in contact with the touchscreen and without requiring further user input beyond tracking the finger to select said plurality of different particular identified single particular data elements.

4. The method of claim 1, wherein the magnified portion of the graph is displayed on the touchscreen above the position of the location of the finger touching of the touchscreen.

5. The method of claim 1, further comprising:
    displaying a crosshair indicating said first single particular data element of the plurality of data elements in said first magnified portion of the graph overlayed over the graph on the touchscreen displaced from the first position such that viewing the crosshair and the first magnified portion is not obstructed by the finger; and
    displaying the crosshair indicating said second single particular data element of the plurality of data elements in said second magnified portion of the graph overlayed over the graph on the touchscreen displaced from the second position such that viewing the crosshair and the second magnified portion is not obstructed by the finger.

6. The method of claim 1, wherein the graph is one of a scatter graph and a bar graph.

7. The method of claim 1, further comprising:
receiving a plurality of selections of a plurality of locations on the touchscreen in succession;
tracking the plurality of locations while the finger is moving around the touchscreen in contact with the touchscreen;
dynamically calculating a distance metric for each of the plurality of locations based on a density of elements appearing at each of the plurality of locations; and
automatically updating the magnified portion of the graph and the tooltip to correspond to each of the plurality of locations and distance metric as each of the plurality of selections are received without requiring further user action.

8. A mobile device including a magnifying tool for magnifying content displayed on the mobile device, the mobile device comprising:
a computer readable storage medium and processor;
a touchscreen operable to receive input from a user and display content comprising a plurality of data elements;
wherein said mobile device is configured to perform steps comprising
displaying a graph comprising a plurality of data elements arranged on one or more axis on the touchscreen of the mobile device,
enabling a magnification process in response to said displaying of said graph,
receiving a selection of a first location on the touchscreen by a finger touching the touchscreen at said first location,
determining a first position of the finger touching of the touchscreen,
calculating a first distance metric dependent upon a first density of data elements at the first position,
determining a first portion of the graph to magnify in response to the first position of the finger touching of the touchscreen based on the first position of the finger touching of the touchscreen and the first distance metric,
using said magnification process, enabled by said displaying of said graph, to magnify the first portion of the graph and overlay a first magnified portion of the graph over the graph on the touchscreen displaced from the first position such that viewing the first magnified portion is not obstructed by the finger,
identifying a first single particular data element of the plurality of data elements centrally located in the first magnified portion of the graph,
automatically displaying on the touchscreen, in response to said automatically identifying said first single particular data element and without requiring further user action, entirely outside the first magnified portion of the graph, a tooltip for the identified first single particular data element which is centrally located in the first magnified portion of the graph, wherein the tooltip includes information about the first single particular data element wherein the information was not present in the graph,
receiving a selection of a second location on the touchscreen by tracking the finger while the finger is moving around the touchscreen in contact with the touchscreen,
determining a second position of the finger touching of the touchscreen while the finger is moving around the touchscreen in contact with the touchscreen,
calculating a second distance metric dependent upon a second density of data elements at the second position,
determining a second portion of the graph to magnify in response to the second position of the finger touching of the touchscreen based on the second position of the finger touching of the touchscreen and the second distance metric,
using said magnification process, enabled by said displaying of said graph, to magnify the second portion of the graph and overlay a second magnified portion of the graph over the graph on the touchscreen displaced from the second position such that viewing the second magnified portion is not obstructed by the finger,
identifying a second single particular data element of the plurality of data elements centrally located in the second magnified portion of the graph, and
automatically displaying on the touchscreen, in response to said automatically identifying said second particular data element and without requiring further user action, entirely outside the first magnified portion of the graph, a tooltip for the identified second single particular data element which is centrally located in the second magnified portion of the graph, wherein the tooltip includes information about the second single particular data element wherein the information was not present in the graph.

9. The mobile device of claim 8 wherein the first portion of the graph to magnify and the second portion of the graph to magnify are circular and the first distance metric and the second distance metric correspond to a first radius of the first portion of the graph to magnify and a second radius the second portion of the graph to magnify.

10. The mobile device of claim 8, wherein the mobile device is configured to automatically display a plurality of different single particular tooltips for a plurality of different particular identified single particular data elements in response to tracking the finger touching the touchscreen through a plurality of locations while the finger is moving around the touchscreen in contact with the touchscreen and without requiring further user input beyond tracking the finger to select said plurality of different particular identified single particular data elements.

11. The mobile device of claim 8, wherein the first magnified portion of the content is displayed displaced from and above the first position of the first location on the touchscreen such that viewing the first magnified portion is not obstructed by the finger.

12. The mobile device of claim 8, wherein said mobile device is further configured to perform further steps comprising:
displaying a crosshair indicating said first single particular data element of the plurality of data elements in said first magnified portion of the graph overlayed over the graph on the touchscreen displaced from the first position such that viewing the crosshair and the first magnified portion is not obstructed by the finger; and
displaying the crosshair indicating said second single particular data element of the plurality of data elements in said second magnified portion of the graph overlayed over the graph on the touchscreen displaced from the second position such that viewing the crosshair and the second magnified portion is not obstructed by the finger.

13. The mobile device of claim 8, wherein when the mobile device receives a plurality of selections of a plurality of locations on the touchscreen in succession, the device:
tracks the plurality of locations while the finger is moving around the touchscreen in contact with the touchscreen;

dynamically calculates a distance metric for each of the plurality of locations based on a density of elements appearing at each of the plurality of locations; and automatically updates the magnified portion of the content and the tooltip to correspond to each of the plurality of locations and distance metric as each of the plurality of selections are received without requiring further user action.

14. A non-transitory computer readable storage medium including instructions stored thereon which, when executed by a device having a touchscreen, cause the device to perform steps comprising:

displaying a graph comprising a plurality of data elements arranged on one or more axis on the touchscreen of the device, wherein the device includes a computer readable medium and processor;

enabling a magnification process in response to said displaying of said graph;

receiving a selection of a first location on the touchscreen by a finger touching the touchscreen at said first location;

determining a first position of the finger touching of the touchscreen;

calculating a first distance metric dependent upon a first density of data elements at the first position;

determining a first portion of the graph to magnify in response to the first position of the finger touching of the touchscreen based on the first position of the finger touching of the touchscreen and the first distance metric;

using said magnification process, enabled by said displaying of said graph, to magnify the first portion of the graph and overlay a first magnified portion of the graph over the graph on the touchscreen displaced from the first position such that viewing the first magnified portion is not obstructed by the finger;

automatically identifying a first single particular data element of the plurality of data elements centrally located in the first magnified portion of the graph;

automatically displaying on the touchscreen, in response to said automatically identifying said first single particular data element and without requiring further user action, entirely outside the first magnified portion of the graph, a tooltip for the identified first single particular data element which is centrally located in the first magnified portion of the graph, wherein the tooltip includes information about the first single particular data element wherein the information was not present in the graph;

receiving a selection of a second location on the touchscreen by tracking the finger while the finger is moving around the touchscreen in contact with the touchscreen;

determining a second position of the finger touching of the touchscreen while the finger is moving around the touchscreen in contact with the touchscreen;

calculating a second distance metric dependent upon a second density of data elements at the second position;

determining a second portion of the graph to magnify in response to the second position of the finger touching of the touchscreen based on the second position of the finger touching of the touchscreen and the second distance metric;

using said magnification process, enabled by said displaying of said graph, to magnify the second portion of the graph and overlay a second magnified portion of the graph over the graph on the touchscreen displaced from the second position such that viewing the second magnified portion is not obstructed by the finger;

automatically identifying a second single particular data element of the plurality of data elements centrally located in the second magnified portion of the graph; and automatically displaying on the touchscreen, in response to said automatically identifying said first single particular data element and without requiring further user action, entirely outside the first magnified portion of the graph, a tooltip for the identified second single particular data element which is centrally located in the second magnified portion of the graph, wherein the tooltip includes information about the second single particular data element wherein the information was not present in the graph.

15. The non-transitory computer readable storage medium of claim 14, wherein the first portion of the graph to magnify and the second portion of the graph to magnify are circular and the first distance metric and the second distance metric correspond to a first radius of the first portion of the graph to magnify and a second radius the second portion of the graph to magnify.

16. The non-transitory computer readable storage medium of claim 14, wherein said steps further comprise, automatically displaying a plurality of different single particular tooltips for a plurality of different particular identified single particular data elements in response to tracking the finger touching the touchscreen through a plurality of locations while the finger is moving around the touchscreen in contact with the touchscreen and without requiring further user input beyond tracking the finger to select said plurality of different particular identified single particular data elements.

17. The non-transitory computer readable storage medium of claim 14, wherein the first magnified portion of the content is displayed displaced from and above the first position of the first location on the touchscreen such that viewing the first magnified portion is not obstructed by the finger.

18. The non-transitory computer readable storage medium of claim 14, including further instructions stored thereon which, when executed, cause the device to perform steps further comprising:

displaying a crosshair indicating said first single particular data element of the plurality of data elements in said first magnified portion of the graph overlayed over the graph on the touchscreen displaced from the first position such that viewing the crosshair and the first magnified portion is not obstructed by the finger; and displaying the crosshair indicating said second single particular data element of the plurality of data elements in said second magnified portion of the graph overlayed over the graph on the touchscreen displaced from the second position such that viewing the crosshair and the second magnified portion is not obstructed by the finger.

19. The non-transitory computer readable storage medium of claim 14, wherein the graph is one of a bar graph and a scatter graph.

20. The non-transitory computer readable storage medium of claim 14, further comprising:

receiving a plurality of selections of a plurality of locations on the touchscreen in succession while the finger is moving around the touchscreen in contact with the touchscreen;

tracking the plurality of locations while the finger is moving around the touchscreen in contact with the touchscreen;

dynamically calculating a distance metric for each of the plurality of locations based on a density of elements appearing at each of the plurality of locations; and automatically updating the magnified portion of the content and the tooltip to correspond to each of the plurality of locations and distance metric as each of the plurality of selections are received without requiring further user action.

\* \* \* \* \*